Figure 1:
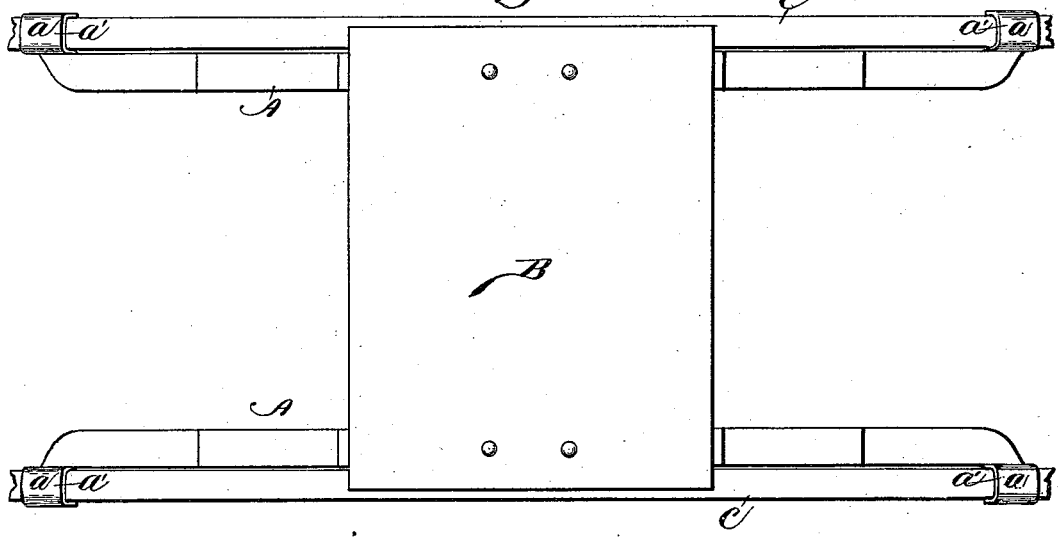

(No Model.)  G. T. GLOVER.  2 Sheets—Sheet 1.
SPRING FOR VEHICLES.

No. 553,558.  Patented Jan. 28, 1896.

Witnesses  
W. D. Middleton  
F. Arthur Faienger

Inventor  
George T. Glover  
By Chas. G. Page  
Atty (No Model.) 2 Sheets—Sheet 2.
G. T. GLOVER.
SPRING FOR VEHICLES.
No. 553,558. Patented Jan. 28, 1896.
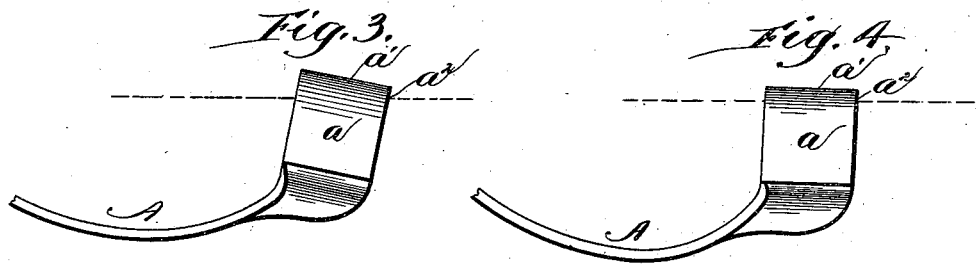
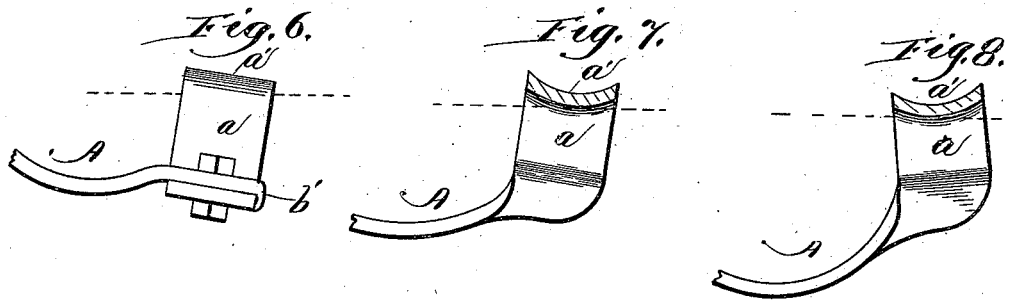
Witnesses
W. D. Middleton
J. Arthur Faeringer
Inventor
George T. Glover
By Chas. G. Page
Atty

UNITED STATES PATENT OFFICE.

GEORGE T. GLOVER, OF CHICAGO, ILLINOIS.

SPRING FOR VEHICLES.

SPECIFICATION forming part of Letters Patent No. 553,558, dated January 28, 1896.

Application filed September 28, 1893. Serial No. 486,716. (No model.)

*To all whom it may concern:*

Be it known that I, GEORGE T. GLOVER, a citizen of the United States, residing at Chicago, in the county of Cook and State of Illinois, have invented a certain new and useful Improvement in Springs for Vehicles, of which the following is a specification.

My invention relates to the construction and arrangement of bow or half-elliptic springs for sustaining vehicle-seats, vehicle-bodies, and the like.

In constructing a bow or half-elliptic spring for supporting the seat or light body of a vehicle I provide each end of a flat spring-bar, which is bent to form the main length of the bowed or half-elliptic spring, with an upturned hook-shaped end portion arranged to engage and bear upon the upper edges of the sides of the vehicle-body or to engage and bear upon the bolster or axle or other suitable portion of the vehicle, according to the desired service and location of the spring. The bow-spring is sustained by its hook-shaped ends and is free for resilient action throughout all of its length between the points at which its hook-shaped ends engage and bear upon the body or bolster or axle or other suitable portion of the vehicle. These hook-shaped ends of the bow-spring are formed and arranged to rock upon the support which they engage, and they are also formed and arranged relatively to one another and relatively to the height and radius of the upwardly-arching main length of the bow-spring, so as to avoid end slip or shift along the support with which they engage. To such end the top or upper portions of these hook-shaped ends of the bow-spring provide bearing-surfaces which impinge upon the support and which are normally at opposite angles to an imaginary line connecting the ends of the bow-spring, whereby during the various flexions to which the spring is subjected during use the hook-shaped ends of the bow-spring will have a synchronous rocking action, and hence synchronously vary the said angles of their bearing portions relatively to the said imaginary line connecting the ends of the bow-spring. The height of the upturned parts which form the side portion of these hooks must also graduate in length with reference to the ends of the bow, and the greatest height of the latter above the aforesaid imaginary line, so as to permit the said side portions of the hook-shaped ends of the bow-spring to have a latitude of swing or vibration sufficient to take up the longitudinal extension or straightening out of the bow during flexion and thereby prevent end thrust or slip of the bearing portions of the hook-shaped ends along the support upon which they are arranged to rock. As a result of this arrangement, the extension of the chord or imaginary line connecting the ends of the bowed portion of the spring, when the latter is depressed and more or less straightened out, is equally distributed between the two vibratory side portions of the hook-shaped ends of the bow-spring, and hence the latter will be maintained in proper position upon a support, to which it can be readily applied and from which it can be readily removed.

When it is desired to provide a stronger spring—for example, for heavier vehicle-bodies—I duplicate the bow—that is to say, I provide two bow-springs of the foregoing-described character arranged side by side and connected at their ends by upturned hook portions which are adapted for operation substantially as hereinbefore described in connection with the single bow-spring.

Prominent advantages involved in the foregoing-described matters are the disuse of shackles in the construction and application of bow-springs for vehicles, and at the same time the securement of the range of resilient action and automactic adaptation incident to the use of shackles; the provision of a simpler and more economical construction; the provisions of a bow-spring possessing a high degree of efficiency; easy application and easy removal of the spring; avoidance of end slip or end-thrust of the bearing portion of a bow-spring along the support by which it is sustained, and at the same time the securement of the widest range of an equable flexion and resilient action on the part of the bow-spring.

The hooked-shaped end portions of the spring, whether single or double, can be made integral with the spring or be made separate from the spring and secured thereto, it being observed that while I may form the structure of more than one piece, and suitably secure together the component parts, I find it preferable to form the whole in one piece, so as to secure economy in manufacture and durability in use.

Figure 2:
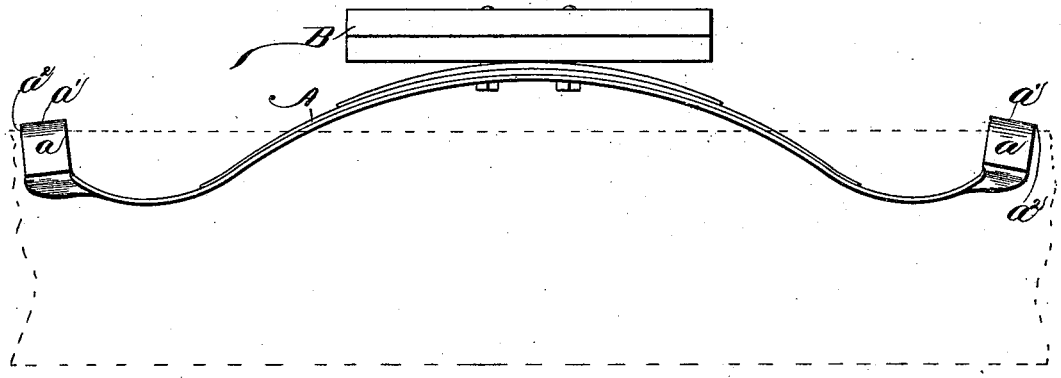

In the accompanying drawings, Figure 1 is a top plan view of a vehicle-seat supported by a couple of single bow-springs embodying the principles of my invention. Fig. 2 represents the same in side elevation. Fig. 3 shows in side elevation and on a larger scale one of the hook-shaped end portions of the bow-spring in its normal position, assuming the dotted line to represent a support for both ends of the spring. Fig. 4 is a like view illustrating the extent to which each hook-shaped end portion of the bow-spring can rock, it being understood that while one end only is illustrated in said figure, both ends of the spring are alike and have the same latitude of movement. Fig. 5 is a top plan view of a double bow-spring supported upon the bolster or axle of a vehicle and embodying the principles of my invention. Fig. 6 shows one of the ends of the bow-spring having its hook portion made separate from the main length of the spring and secured thereto. Fig. 7 represents one of the hook-shaped ends of the bow-spring having a curved bearing-surface. Fig. 8 is a like view illustrating the rocking action of the hook-shaped end of Fig. 7.

With reference to the first four figures the half-elliptic or bow spring A is formed by suitably bending a flattened bar so as to provide it with a bowed portion having its flattened end portions turned up and adapted to form hook-shaped clips or lips, which may be termed the "hook-shaped ends" of the bow-spring. Each flattened end portion of the bow-spring is deflected laterally, as indicated in Fig. 1, and also bent upwardly to form the side $a$ of the hook-shaped portion, and further bent laterally to the plane of said side $a$ so as to form the upper flattened bearing portion $a'$ of the hook. These upper portions $a'$ of the hooks are also so arranged that when the spring is in its normal condition the flat bearing-surfaces of said upper portions lie at opposite angles to a chord or imaginary line between the ends of the spring, and hence when the hook-shaped ends are arranged and supported upon the top edge $c$ of one of the sides of a vehicle-body, said flat bearing-surfaces will each lie at an angle to the said support, and the said flat bearing-surfaces will also converge upwardly toward a line passing vertically through the raised middle portion of the bow-spring. This normal condition of the bow-spring and its hook-shaped ends is illustrated in Figs. 2 and 3, wherein the support, such as the top edge of one of the sides of a vehicle-body, is indicated in dotted lines. Where the bearing-surfaces of the hook-shaped ends of the bow-spring are flat the rear edges $a^2$ of the bearing portions of the hooks will normally bear upon the support and form fulcra for the rocking hook-shaped portions of the bow-spring, and thereby permit the hooks to synchronously rock during the flexions of the bow-spring.

The upturned portions of the spring which form the side portions $a$ of the hooks are so proportioned in length with relation to the action of the spring and height of the bow portion of the spring above a chord or imaginary line connecting its ends that when the spring is depressed and more or less straightened out the said side portions $a$ of the hooks will simultaneously swing in opposite directions to an extent proportional to the end movements of the spring, and thereby permit such action to take place without causing the bearing portions of the hooks to slip or shift along their supports. The hook-shaped end portions of the bow-spring will therefore rock at fixed points upon the support, and such points will not be changed by reason of any straightening-out movement of the bow-spring.

As a preferred construction the hook-shaped ends of the bow-spring are integral with the body or main leaf or length of the spring, although they can be made separate therefrom and be secured thereto by welding or by rivets or analogous means.

As indicated in Fig. 4, which shows one of the hook-shaped ends of the bow-spring, the latter can be depressed by the load to an extent to bring the flattened bearing-surface of such hook-shaped portion flat upon the support, and if the spring should be further depressed the rear edge of the bearing-surface of the hook-shaped portion will rise from said support and the latter will then be engaged by the opposite forward edge of said bearing-surface. Regardless, therefore, of the flexions of the bow-spring, its hook-shaped end portions synchronously rock during such actions without end thrust or slip, and at the same time the spring will be free to act throughout its length and to simultaneously extend and retract at both ends of the bow.

Where a stronger spring is desired, I combine a couple of springs, such as hereinbefore described, so as to form a double spring, as illustrated in Fig. 5, wherein each spring portion $C'$ is understood to be a bow-spring formed by a flat spring-bar bent into proper bow shape. At each end of this double spring is a raised hook-shaped end portion, substantially similar in construction and function to the hook-shaped end portions hereinbefore described, it being seen that each bow $C'$ of this double spring is deflected laterally at each end, and that such laterally-deflected portion is also turned up and then again bent laterally, whereby the double spring is provided at each end with a hook common to each of its two members $C'$. At the left-hand end of Fig. 5 each end of the two spring members is bent to form a hook, and the two upper portions of these hooks are lapped and riveted together so as to form in effect a hook-shaped end portion $c$ common to both of the bowed spring members C'. At the right-hand end of Fig. 5 the hook-shaped end portion c' of the double spring is made separate from the bowed spring members C' and riveted to the same. These hook-shaped end portions of the double spring can, however, be secured in any other suitable way—for example, by welding—or the whole can be made integral, it being understood that in said spring the flattened bearing portions of the hook-shaped ends normally incline upwardly from the support and normally lie at opposite angles to a chord or imaginary line connecting the ends of the compound spring. By such arrangement each member of the double spring can have the same action as the single bow-spring A, and at the same time the two members C' of the double spring will operate alike, and the hooks at the ends of such double spring will rock without end slip. It will be observed, however, that by the further improvement involved in the construction of Fig. 5, I practically provide each end of the double spring with a hook or clip which is common to the two bow-springs, and that I further provide an exceedingly simple, economical, highly efficient, and evenly-balanced double spring.

Where the clips or hooks for the double or single bow-springs are made separate from the springs and bolted thereto, the ends of the springs are preferably provided with lips forming abutments for the lower portions of the hooks, as in Fig. 6, wherein the end of a bow-spring A is shown provided with a lip b' for said purpose.

In Figs. 6 and 7 the bearing surface or portion of the hook-shaped end of the bow-spring A is curved and understood to be arranged to rock upon a support indicated by dotted lines, it being understood that the double as well as the single bow-springs can have end bearing portions formed by the hooks shown in Figs. 7 and 8. It will be seen, however, that when the bow-spring (either single or double) is in its normal condition, or in the condition it will normally assume when arranged as a seat or body supporting spring in a vehicle, the curved bearing portions of the two end hooks of the form shown in Fig. 1 will lie at opposite angles to a chord or imaginary line between the ends of the bow-spring—that is to say, the bearing portions of the hooks will rise from the points at which they impinge upon the support—so as to form substantially angular spaces between the support and the forward parts of such bearing portions, which said angular spaces will vary during the rocking action of the bearing. These curved bearing portions of the hooks will not slip upon the support, and will rock easily thereon, and as a further advantage the spring will shorten up, and hence become practically stronger, when it is depressed by the load, it being seen that the distance between the two points at which the curved bearings of the hooks impinge upon the support when the spring is in its normal condition, as in Fig. 7, will be greater than the distance between said points when the spring is depressed, as in Fig. 8.

As illustrated, any suitable number of spring-leaves can also be applied upon the main portion of the bow-spring, as is usual in bow-springs for vehicles.

With further reference to my invention it will be seen that the spring, whether single or double, must be a bow-spring in contradistinction to the form of spring of my Patent No. 481,695, which, as incident to the form of spring, shows a flattened supporting-hook, and in further contradistinction to other patented springs of record, and also that in accordance with my invention the oppositely-arranged hooks are arranged and flattened to an extent to provide them with bearing-surfaces which normally stand at opposite angles to an imaginary line connecting the ends of the springs—that is to say, a right line between the points where such bearing-surfaces normally rest upon the side of the vehicle-body or the axle or bolster or like support on the vehicle. By this arrangement free action is provided for and end slip is avoided, it being seen that the vertical sides of the hooks form swinging arms which swing when the bow-spring is depressed.

What I claim as my invention is—

1. A bow-spring for vehicles having its ends provided each with a hook located at one side of the spring, and having the top bearing portions of the hooks arranged at opposite angles to an imaginary line connecting the ends of the spring, substantially as and for the purpose described.

2. A bow-spring for vehicles provided at each end with an integral supporting-hook projecting to one side of the spring and having an edge forming a fulcrum adapted to rock upon its support, whereby to permit of the spring having a free action and also to permit the supporting hooks to rock without end slip or thrust, substantially as described.

3. A set of bow shaped vehicle springs having their ends connected by rigid hooks which are rigid with the said springs and arranged to form rocking supports adapted to engage an axle, or bolster, or the like, and rock thereon without end slip substantially as described.

4. A double bow-spring for vehicles comprising a couple of spring bows arranged side by side and formed integral with end connecting portions which are rigid therewith and bent up to form rocking hook shaped supports having bearing portions normally at opposite angles to an imaginary line connecting the ends of the double spring considered as an entirety, substantially as described.

5. A set of vehicle springs having their ends provided with hooks, the portions of the hooks on one spring overlapping those of the other spring and forming rocking bearings, substantially as described.

6. A set of vehicle springs having their ends provided with hooks forming rocking bearings, the hook-portions on one spring being integral therewith and arranged to lap the hook portions integral with the other spring, substantially as described.

7. A bow-spring for vehicles having its ends provided with hooks forming rocking bearings, the bearing portions of said hooks being curved and arranged to provide bearing portions normally at opposite angles to an imaginary line between the ends of the spring, substantially as described.

GEORGE T. GLOVER.

Witnesses:
W. D. MIDDLETON,
F. ARTHUR FALLINGER.